(12) United States Patent
Fisher et al.

(10) Patent No.: US 8,192,890 B2
(45) Date of Patent: Jun. 5, 2012

(54) FUEL CELL AIR EXCHANGE APPARATUS

(75) Inventors: Tobin J. Fisher, San Francisco, CA (US); Tibor Fabian, Mountain View, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 799 days.

(21) Appl. No.: 12/322,352

(22) Filed: Jan. 29, 2009

(65) Prior Publication Data

US 2009/0305112 A1 Dec. 10, 2009

Related U.S. Application Data

(60) Provisional application No. 61/062,961, filed on Jan. 29, 2008.

(51) Int. Cl.
*H01M 8/24* (2006.01)
(52) U.S. Cl. ............ 429/471; 429/9; 429/434; 429/439; 429/467; 429/469; 429/470; 429/508; 429/511
(58) Field of Classification Search .............. 429/9, 433, 429/434, 439, 467, 469, 470, 471, 508, 511, 429/514, 516
See application file for complete search history.

(56) References Cited

U.S. PATENT DOCUMENTS

| | | | |
|---|---|---|---|
| 3,774,589 A | 11/1973 | Kober |
| 4,846,176 A | 7/1989 | Golden |
| 5,817,157 A | 10/1998 | Checketts |
| 6,250,078 B1 | 6/2001 | Amendola |
| 6,326,097 B1 | 12/2001 | Hockaday |
| 6,375,638 B2 | 4/2002 | Nason |
| 6,392,313 B1 | 5/2002 | Epstein |
| 6,433,129 B1 | 8/2002 | Amendola |
| 6,468,694 B1 | 10/2002 | Amendola |
| 6,497,973 B1 | 10/2002 | Amendola |
| 6,524,542 B2 | 2/2003 | Amendola |
| 6,534,033 B1 | 3/2003 | Amendola |
| 6,544,400 B2 | 4/2003 | Hockaday |
| 6,544,679 B1 | 4/2003 | Petillo |
| 6,579,068 B2 | 6/2003 | Bridger |
| 6,586,563 B1 | 7/2003 | Ortega |
| 6,645,651 B2 | 11/2003 | Hockaday |
| 6,660,685 B1 | 12/2003 | Schussler |

(Continued)

FOREIGN PATENT DOCUMENTS

JP  02-234358  9/1990

(Continued)

OTHER PUBLICATIONS

D.J. Laser and J.G. Santiago, "A Review of Micropumps", J. Micromech. Microeng.; vol. 14 (2004) R35-R64.

(Continued)

*Primary Examiner* — Patrick Ryan
*Assistant Examiner* — Ben Lewis
(74) *Attorney, Agent, or Firm* — Jeffrey Schox

(57) ABSTRACT

A fuel cell air exchanger is provided. The fuel cell air exchanger includes a platform having at least one throughput opening and at least one holding post, where the holding post fixedly holds a fuel cell offset from the platform and proximal to the opening, where the opening can have many shapes. The fuel cell air exchanger provides an unimpeded air exchange through the openings to the fuel cell and can be flexible, semi-flexible or rigid. The fuel cell air exchanger can hold an array of fuel cells and fuel cell electronics. A chimney feature provides enhanced airflow when the air exchanger is disposed in a vertical position.

10 Claims, 4 Drawing Sheets

U.S. PATENT DOCUMENTS

| | | |
|---|---|---|
| 6,670,444 B2 | 12/2003 | Amendola |
| 6,683,025 B2 | 1/2004 | Amendola |
| 6,713,201 B2 | 3/2004 | Bullock |
| 6,796,898 B1 | 3/2004 | Snover |
| 6,723,072 B2 | 4/2004 | Flaherty |
| 6,745,801 B1 | 6/2004 | Cohen |
| 6,808,833 B2 | 10/2004 | Johnson |
| 6,818,334 B2 | 11/2004 | Tsang |
| 6,821,499 B2 | 11/2004 | Jorgensen |
| 6,834,632 B2 | 12/2004 | Kataoka |
| 6,840,955 B2 | 1/2005 | Ein |
| 6,849,351 B2 | 2/2005 | Hartnack |
| 6,887,596 B2 | 5/2005 | Leban |
| 6,916,159 B2 | 7/2005 | Rush |
| 6,924,054 B2 | 8/2005 | Prasad |
| 7,105,033 B2 | 9/2006 | Strizki |
| 7,105,245 B2 | 9/2006 | Ohlsen |
| 7,316,719 B2 | 1/2008 | Devos |
| 7,645,536 B2 | 1/2010 | Akiyama |
| 7,666,386 B2 | 2/2010 | Withers-Kirby |
| 2002/0182459 A1 | 12/2002 | Hockaday |
| 2003/0009942 A1 | 1/2003 | Amendola |
| 2003/0027487 A1 | 2/2003 | Amendola |
| 2003/0082427 A1 | 5/2003 | Prasad |
| 2003/0138679 A1 | 7/2003 | Prasad |
| 2003/0198558 A1 | 10/2003 | Nason |
| 2003/0235724 A1 | 12/2003 | Ord |
| 2004/0011662 A1 | 1/2004 | Xu |
| 2004/0048132 A1 | 3/2004 | Takai et al. |
| 2004/0052704 A1 | 3/2004 | Devos |
| 2004/0062965 A1 | 4/2004 | Morse |
| 2004/0062978 A1 | 4/2004 | Yazici |
| 2004/0089415 A1 | 5/2004 | Cho |
| 2004/0131903 A1 | 7/2004 | Shioya |
| 2004/0148857 A1 | 8/2004 | Strizki |
| 2004/0197214 A1 | 10/2004 | Arthur |
| 2004/0202548 A1 | 10/2004 | Dai |
| 2004/0211054 A1 | 10/2004 | Morse |
| 2004/0229101 A1 | 11/2004 | Davis |
| 2004/0253500 A1 | 12/2004 | Bourilkov |
| 2005/0037245 A1 | 2/2005 | Pham |
| 2006/0127734 A1 | 6/2006 | McLean |
| 2006/0196112 A1 | 9/2006 | Berry |
| 2006/0275645 A1 | 12/2006 | Gallagher |
| 2007/0020171 A1 | 1/2007 | Withers-Kirby |
| 2007/0042244 A1 | 2/2007 | Spallone |
| 2010/0150824 A1 | 6/2010 | Withers-Kirby |

FOREIGN PATENT DOCUMENTS

| | | |
|---|---|---|
| JP | 2002/234358 | 1/2006 |
| JP | 2002/234358 | 2/2006 |
| WO | 2004/001235 | 12/2003 |
| WO | 2004/0062978 | 4/2004 |

OTHER PUBLICATIONS

Ying, Wu, "Hydrogen Storage via Sodium Borohydride: Current Status, Barriers & R&D Roadmap", Presentation presented at GCEP, Stanford University, Apr. 14-15, 2003.

US 8,192,890 B2

FUEL CELL AIR EXCHANGE APPARATUS

CROSS-REFERENCE TO RELATED APPLICATIONS

This application is cross-referenced to and claims the benefit from U.S. Provisional Application 61/062961 filed Jan. 29, 2008, and which are hereby incorporated by reference.

FIELD OF THE INVENTION

The invention relates generally to fuel cells. More particularly, the invention relates to providing unobstructed airflow to the fuel cell.

BACKGROUND

Many types of batteries and fuel cells consume oxygen from the air to produce electricity. Two methods for doing this include active systems, in which an air pump or fan is used for moving the air, and passive systems that depend on buoyancy driven convection and the diffusion of oxygen to the surface of the reaction surface for the production of electricity. During normal operation, it is possible in passive systems for the diffusion of oxygen to the reaction surface to be limited or stopped if the surface is obstructed, reducing the maximum power output from the cell. Planar arrays of these cells can be constructed to produce more power. In one possible scenario, if the array of fuel cells is integrated into the upper spine region of an article of clothing, leaning back into a high backed chair or wearing a backpack can obstruct the diffusion of oxygen to the cells, limiting their power output. Alternatively, if the array is used for powering for instance a laptop, the oxygen diffusion to the cathodes can be easily obstructed when operating inside of a bag.

Accordingly, there is a need to develop mechanical device creating an air gap over the surface fuel cells to increase the system's resistance to smothering by obstruction with air impermeable objects.

SUMMARY OF THE INVENTION

The present invention provides a fuel cell air exchanger. The fuel cell air exchanger includes a platform having at least one opening there through and at least one holding post, where the holding post fixedly holds a fuel cell offset from the platform and proximal to the opening. The fuel cell air exchanger provides an unimpeded air exchange through the openings to the fuel cell.

According to one aspect of the invention, the platform has a material property that can be flexible, semi-flexible or rigid.

According to another aspect of the invention, the holding posts are disposed an array, where the array of holding posts fixedly holds an array of the fuel cells offset from the platform.

In a further aspect, the openings have a shape that can be circular, square, rectangular and polygonal.

In another aspect, the height of the holding post offset can be in a range from 0.5 to 7 mm.

In yet another aspect of the invention, the platform further includes an electronics holding region.

In another aspect, the platform further includes a vertical-orientation chimney channel.

In another aspect, the platform further includes protruding columns over the fuel cell, where the protruding column can abut the fuel cell and provides isolation for an intra-cell connection.

In a further aspect, the platform can be articulated between at least two of the fixedly held fuel cells.

In another aspect of the invention, the platform can be made from materials that include metals, alloys composites, ceramics and plastics.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
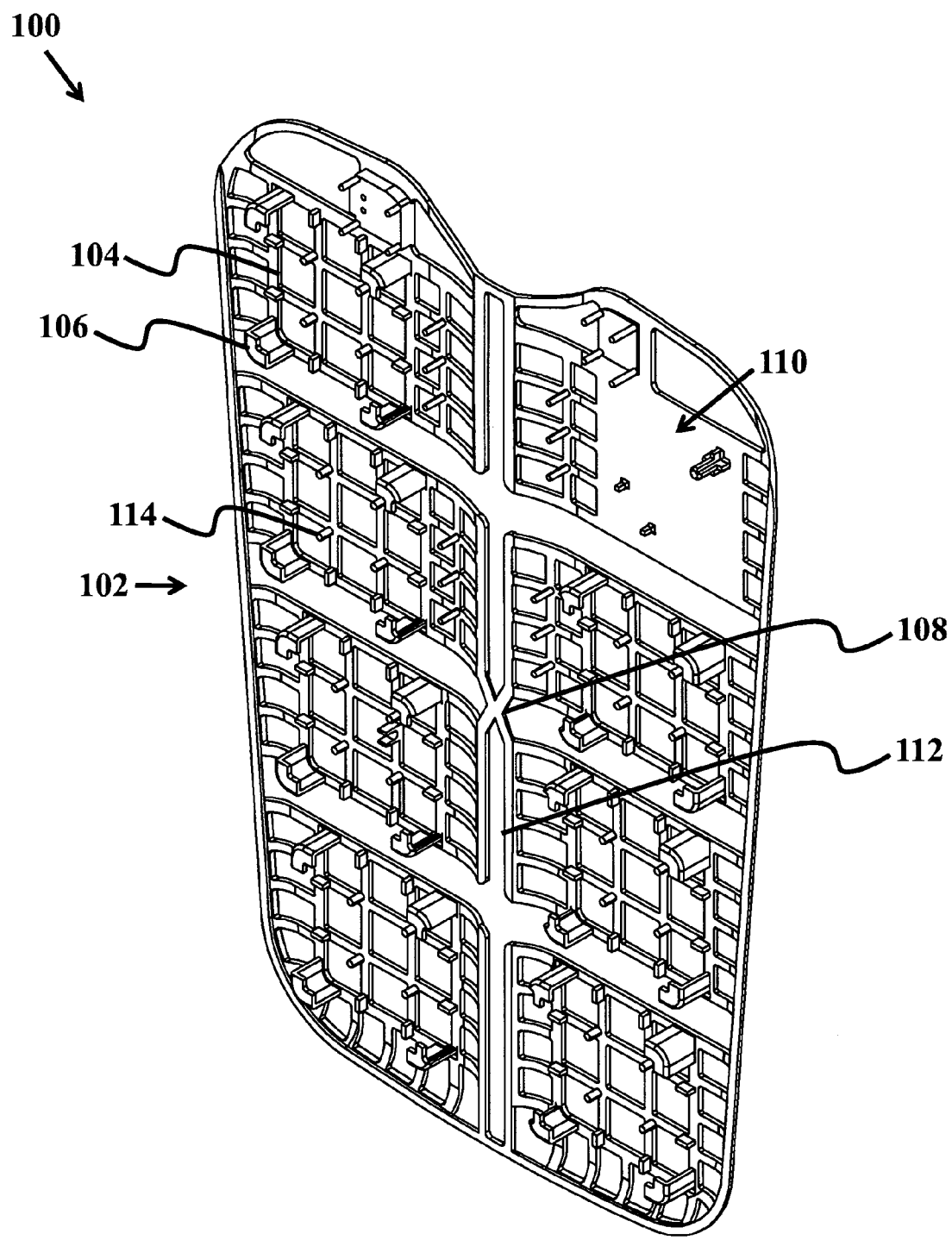
FIG. 1 shows a perspective view of a fuel cell air exchanger according to the present invention.
Figure 2:
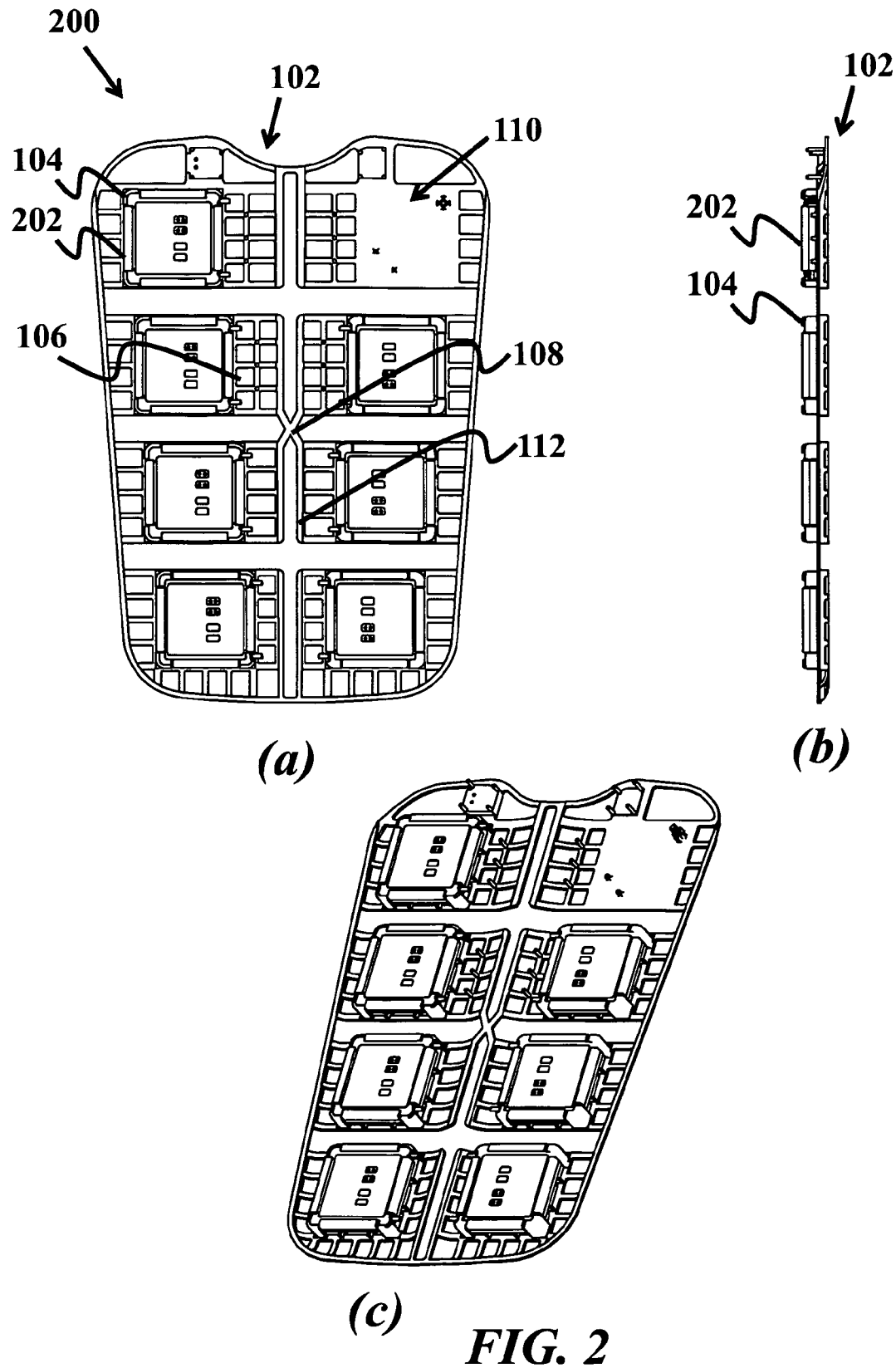
FIGS. 2(a)-2(c) shows planar front, planar side and perspective views of a fuel cell array and the fuel cell air exchanger assembly, respectively according to the present invention.
Figure 3:
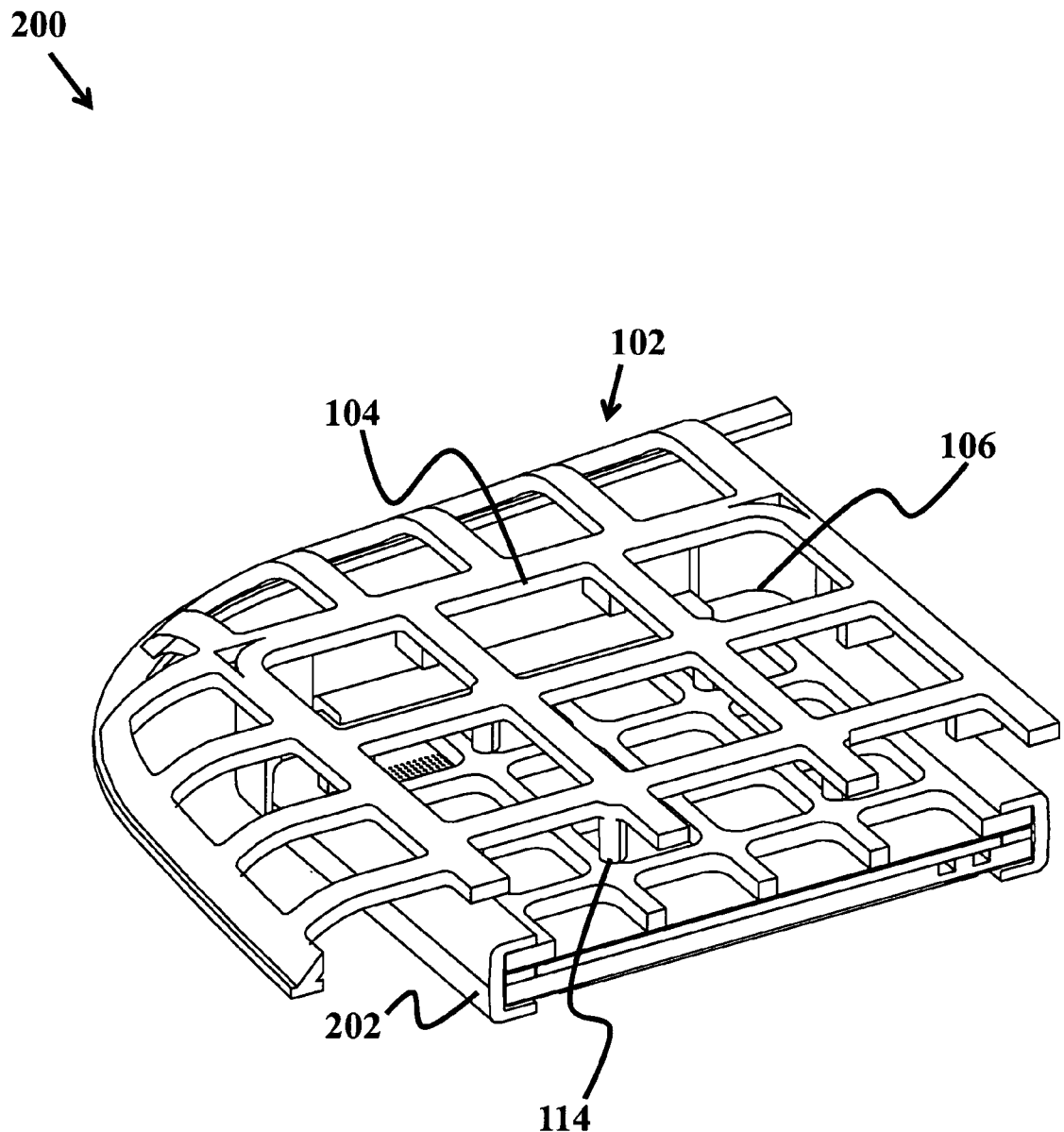
FIG. 3 shows protruding columns used for providing a positive stop to the cells when the fuel cell air exchanger is flexed according to the present invention.

Referring to the figures, FIG. 1 shows a perspective view of a fuel cell air exchanger 100, and FIGS. 2(a) and 2(b) show planar and perspective views of a fuel cell array and the fuel cell air exchanger assembly 200, respectively. As shown in FIG. 1, the fuel cell air exchanger 100 includes a platform 102 having openings 104 through the platform 102 and holding posts 106, where the holding posts 106 are disposed in a pattern that fixedly holds one or more fuel cells 202, such as an array of FIG. 2, at an offset from the platform 102 and near the opening 104. The fuel cell air exchanger 100 provides an unimpeded air exchange through the openings to the fuel cell. The platform 102 can be flexible, semi-flexible or rigid, where the platform 102 can be made from materials that include metals, alloys composites, ceramics and plastics, to name a few.

As shown in FIG. 1, the openings 104 have a square shape, however many other columnar shapes are possible such as circular, rectangular or polygonal for example. According to the embodiment shown, the platform 102 further includes an electronics holding region 108. Also shown in the figures, the platform 102 can be articulated 108 between at least two of the fixedly held fuel cells 202. According to one embodiment, the figures further show an electronics holding region 110.

According to one embodiment the air exchanger 100 includes an array of holding posts 106, which are structures protruding from the platform 102 and protruding columns 114 over the cells 202, where the columns 114 provide a stand-off for the cells 202. The protruding columns 114 can be used for providing a positive stop to the cells 202. For example, the holding posts 106 constrain the cell in x, y directions and together with the columns 114 also in the z direction. The cell 202 is fully constrained in all directions, where that posts 114 are in contact with cathode surface of the cell 202 and the holding posts 106 in contact with the sides and back of the anode surface. In one aspect the fuel cells 202 are snap-fitted between posts 106 for assembly.

Additionally, the height of the holding posts 106 in combination with the protruding columns 114 can have an offset that can be in a range from 0.5 to 7 mm, where for the embodiment shown in FIGS. 2(a) and 2(b), the offset is preferably 2 to 3 mm.

The fuel cell air exchanger 100 creates an air gap over the surface of the fuel cells 202, and is used to increase the system's resistance to smothering caused by obstructing the cathode, for example, with air impermeable objects. The space created by the holding posts 106 and protruding columns 114 guarantees a defined oxygen diffusion environment in the vicinity of the cathode surface independently of the diffusion obstacles outside the space. It allows the cells 202 to draw in air in from the surrounding area and increase the power output in smothered situations.

Because the cells 202 often operate at elevated temperatures, it is further possible to encourage air flow when the cells 202 are oriented vertically (see FIG. 2(a)) by creating a vertical channel 112 within or above an array of cells 202 that allows the warm air near the cells 202 to rise, similar to a chimney, further increasing the air flow over the cells 202, thus increasing maximum power output. It is often desirable to have the power generating apparatus be as light as possible, making it beneficial to have the fuel cell air exchanger 100 be as light as possible.

Figure 4:
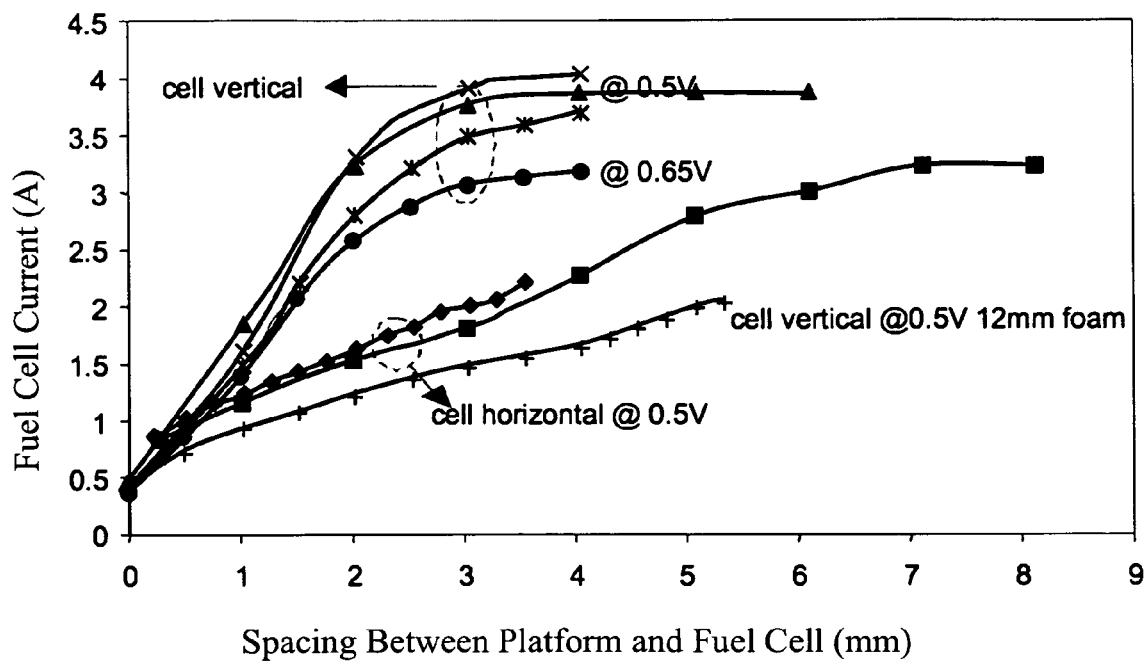
FIG. 4 shows the results of a series of tests evaluating the impact of the air gap over the cell on performance.

The air gap over the cells 202 can be a range of thicknesses, depending on the current draw of the cells and thickness constraints of the system. While a thicker air gap is usually better, it is often desirable to minimize the thickness of the overall system within the bounds of desired performance. In an exemplary 8-Watt system, shown in FIGS. 2(a) and 2(b), an air gap of 1.5-3 mm was found to strike this balance well. FIG. 4 shows the results of a series of tests evaluating the impact of the air gap over the cell 202 on performance. A large impermeable plane was placed in parallel with the cathode surface of the cell. The cell was then operated in a constant voltage mode and the cell current was recorded. A number of possible methods exists for creating the air gap including the use of the protruding columns 114 in the form of stiff foamed or articulated materials or a stiff porous layer offset from the surface of the cells 202 at a number of discrete points. In a preferred embodiment, a grid with a pitch of approximately 10 mm was used with cylindrical columns 114 approximately 2 mm in length at the intersection points of the grid of the platform 102. One possible embodiment of this structure is shown in the figures. In a preferred embodiment, a thermo plastic material was used to minimize fabrication cost with necessary toughness, strength, and flexibility. Any number of cells 202 can be fashioned into an array to increase the voltage and power output of the system 200. In a hydrogen powered fuel cell system, in which each cell 202 produces roughly 0.6 V, practical systems tend to require 6 or more cells 202. These cells 202 can be situated in a number of arrangements, depending on the needs of the application. One preferred embodiment is shown in the figures, in which the cells are arranged with a vertical channel 112, creating a chimney of moving air, further enhancing air flow.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art.

All such variations are considered to be within the scope and spirit of the present invention as defined by the following claims and their legal equivalents.

What is claimed:

1. A fuel cell air exchanger comprising a platform having at least one opening there through and at least one holding post, wherein said holding post fixedly holds a fuel cell offset from said platform and proximal to said opening, whereby an unimpeded air exchange through said opening to said fuel cell is provided.

2. The fuel cell air exchanger of claim 1, wherein said platform has a material property selected from a group consisting of flexible, semi-flexible and rigid.

3. The fuel cell air exchanger of claim 1, wherein said at least one holding post is an array of said holding posts, wherein said array of holding posts fixedly holds an array of said fuel cells offset from said platform.

4. The fuel cell air exchanger of claim 1, wherein said at least one opening has a shape selected from the group consisting of circular, square, rectangular and polygonal.

5. The fuel cell air exchanger of claim 1, wherein a height of said holding post offset is in a range from 0.5 to 7 mm.

6. The fuel cell air exchanger of claim 1, wherein said platform further comprises an electronics holding region.

7. The fuel cell air exchanger of claim 1, wherein said platform further comprises a vertical-orientation chimney channel.

8. The fuel cell air exchanger of claim 1, wherein said platform further comprises protruding columns over said fuel cell, wherein said protruding column abuts said fuel cell and provides isolation for an intra-cell connection.

9. The fuel cell air exchanger of claim 1, wherein said platform is articulated between at least two said fixedly held fuel cells.

10. The fuel cell air exchanger of claim 1, wherein said platform is made from materials selected from a group consisting of metals, alloys composites, ceramics and plastics.

* * * * *